(12) United States Patent  
Ederer et al.

(10) Patent No.: US 11,691,337 B2  
(45) Date of Patent: Jul. 4, 2023

(54) METHOD FOR PRODUCING THREE-DIMENSIONAL MOLDED PARTS AND REGULATING THE MOISTURE CONTENT IN BUILD MATERIAL

(71) Applicant: Voxeljet AG, Friedberg (DE)

(72) Inventors: Ingo Ederer, Geltendorf (DE); Daniel Günther, Munich (DE); Johannes Günther, Martinsried (DE); Ingo Gnüchtel, Villenbach (DE); Florian Mögele, Gessertshausen (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 15/516,991

(22) PCT Filed: Dec. 11, 2015

(86) PCT No.: PCT/DE2015/000590  
§ 371 (c)(1),  
(2) Date: Apr. 5, 2017

(87) PCT Pub. No.: WO2016/095888  
PCT Pub. Date: Jun. 23, 2016

(65) Prior Publication Data  
US 2017/0297263 A1 Oct. 19, 2017

(30) Foreign Application Priority Data

Dec. 17, 2014 (DE) ................ 10 2014 018 579.6

(51) Int. Cl.  
*B29C 64/165* (2017.01)  
*B33Y 70/00* (2020.01)  
(Continued)

(52) U.S. Cl.  
CPC .......... *B29C 64/165* (2017.08); *B28B 7/346* (2013.01); *B28B 7/348* (2013.01);  
(Continued)

(58) Field of Classification Search  
None  
See application file for complete search history.

(56) References Cited

U.S. PATENT DOCUMENTS 10,654,991 B2* 5/2020 Nagai ................. B22C 1/224  
2005/0017394 A1* 1/2005 Hochsmann ......... B33Y 10/00  
264/113  
(Continued)

FOREIGN PATENT DOCUMENTS

DE 10 2004 008 168 A1 2/2004  
EP 0431924 B1 6/1991  
(Continued)

OTHER PUBLICATIONS

International Search Report, Application No. PCT/DE2015/000590, dated Apr. 14, 2016.  
(Continued)

*Primary Examiner* — Richard A Huhn  
(74) *Attorney, Agent, or Firm* — The Dobrusin Law Firm, P.C.

(57) ABSTRACT

A method for producing three-dimensional molded parts by means of layering, the moisture content of the build material mixture being able to be regulated.

20 Claims, 5 Drawing Sheets

(51) Int. Cl.
- *B29C 64/307* (2017.01)
- *B29C 64/209* (2017.01)
- *C09D 7/40* (2018.01)
- *C09D 7/61* (2018.01)
- *B28B 7/34* (2006.01)
- *B29C 33/38* (2006.01)
- *C09D 201/06* (2006.01)
- *B33Y 10/00* (2015.01)
- *B33Y 80/00* (2015.01)
- *B29K 71/00* (2006.01)
- *B29K 509/02* (2006.01)
- *B29L 31/00* (2006.01)
- *C08K 3/36* (2006.01)

(52) U.S. Cl.
CPC ...... *B29C 33/3807* (2013.01); *B29C 33/3842* (2013.01); *B29C 64/209* (2017.08); *B29C 64/307* (2017.08); *B33Y 70/00* (2014.12); *C09D 7/61* (2018.01); *C09D 7/69* (2018.01); *C09D 201/06* (2013.01); *B29K 2065/00* (2013.01); *B29K 2071/02* (2013.01); *B29K 2509/02* (2013.01); *B29K 2909/02* (2013.01); *B29L 2031/757* (2013.01); *B33Y 10/00* (2014.12); *B33Y 80/00* (2014.12); *C08K 3/36* (2013.01); *C08K 2201/005* (2013.01)

(56) References Cited

U.S. PATENT DOCUMENTS

| | | | |
|---|---|---|---|
| 2006/0251826 A1* | 11/2006 | Pfeifer | B01J 2/006 427/558 |
| 2007/0238056 A1 | 10/2007 | Baumann et al. | |
| 2011/0206569 A1 | 8/2011 | Rohde et al. | |
| 2017/0037222 A1* | 2/2017 | Nagai | B22C 9/02 |

FOREIGN PATENT DOCUMENTS

| | | |
|---|---|---|
| EP | 1509382 B1 | 3/2005 |
| EP | 1638758 B1 | 3/2006 |

OTHER PUBLICATIONS

Written Opinion of the International Search Authority, Application No. PCT/DE2015/000590, dated Apr. 14, 2016.
Norazman et al., Spectral Analysis of Infrared Lamps for Use in the High Speed Sintering Process; Aug. 2016.

\* cited by examiner

METHOD FOR PRODUCING THREE-DIMENSIONAL MOLDED PARTS AND REGULATING THE MOISTURE CONTENT IN BUILD MATERIAL

CLAIM OF PRIORITY

This application is a national phase filing under 35 USC § 371 of International Application serial number PCT/DE2015/000590 filed on Dec. 11, 2015, and claims priority therefrom. This application further claims priority to German Patent Application Number DE 10 2014 018 579.6 filed on Dec. 17, 2014. PCT Application Number PCT/DE2015/000590 (published as WO2016/095888 A1) and German Patent Application Number DE 10 2014 018 579.6 are each incorporated herein by reference in its entirety.

FIELD

The invention relates to a method and a material system, which contains a means for regulating the moisture content in a particle mixture.

BACKGROUNDS

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

This object, which is produced from solidified particulate material and is also referred to as a 3D molded part, component or model, is embedded into loose particulate material after being produced and is subsequently removed therefrom. This is done, for example, using an extractor. This leaves the desired objects, from which powder deposits are removed, for example by manual brushing or sand blasting.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

For example, a solid in the particulate material may be used as the binding system. This solid is dissolved by means of a solvent which is expelled from the ink-jet print head. After the solvent evaporates, the particles stick together in the desired locations. The component may be removed from the remaining loose powder after a certain waiting period. The waiting period is generally long, since the solvent is only slowly released from the dissolved material. The components are often weak after unpacking and may be plastically deformed. The volatilization of the solvent produces a certain deposit buildup on the component, which must be removed manually after unpacking. The solvent may additionally attack the print head. Moreover, the dissolution process and subsequent resolidification causes shrinkage in the component and thus also geometric deviations.

A solvent may also be loaded with molecules or particles and then used. The shrinkage may be reduced thereby. The aggressiveness of the solvent may also be decreased while maintaining the same component strength. However, the solvent must be completely removed before unpacking; the problem of deposit buildup occurs here as well.

Another option is to use a system that chemically results in a solidification of the printed fluid and thereby causes a binding of the particles. The system components may be kept separate in the system. The desired solidification reaction does not occur until the printing process. One example of a system of this type may be a method known as the cold resin process. An acid-encased sand is brought into contact with furfuryl alcohol. This results in a chemical reaction, which causes the previously liquid components to be converted to a cross-linked plastic.

In this method, the sand must be premixed in the 3D printer with the aid of a coater immediately before being applied, since the reactivity of the admixed particulate material depends not only on the acidity of the acid but also on the moisture content of the overall mixture. If the introduced acid dries out too much, the homogeneous hardening of the printed furfuryl alcohol is prevented, and the objects will no longer achieve a sufficient strength. In addition, the flow property of the powder material is subject to enormous fluctuations, due to the drying. The powder outflow from the coater is thus no longer safely controllable. On the one hand, this greatly limits the shelf life of the admixed sand, and on the other hand, it becomes very difficult or even impossible to reuse the unprinted sand in the process.

The specifications EP 1 638 758 B1 and EP 1 509 382 B1 illustrate a method and a device for a process of this type.

One problem when manufacturing with the aforementioned methods and when using the aforementioned build materials is to ensure uniform material properties during the build process. In particular, the flow properties of the build material should be mentioned. In this connection, the moisture content in the build materials applied to the build space plays an important role.

In known methods, variations in the build materials occur again and again during the course of the build process, which negatively impact the method itself and ultimately the properties of the molded parts obtained or quality standards in an undesirable manner.

The object of the invention is therefore to provide a method and a material system which avoid or at least reduce the disadvantages of the prior art.

SUMMARY OF THE INVENTION

In one aspect, the invention relates to a method for producing three-dimensional molded parts by means of layering, particulate build material being applied to a build space in a defined layer thickness with the aid of a coater, binder fluid being selectively applied to the build material by means of a print head, the binder fluid being polymerized with the aid of at least one activator introduced into the sand, the build space being lowered by the distance of the layer thickness, or the coater being raised by the distance of one layer thickness, and these steps being repeated until the desired molded part is produced, means being present in or introduced into the build material, binder fluid and/or activator which may be used to regulate the moisture content of the build material mixture.

In the method according to the invention, the moisture in the sand is regulated. In particular, the water content and the liquid content is regulated or at least stabilized. As a result, the same chemical and physical properties may essentially always be achieved.

In another aspect, the invention relates to a material system for producing three-dimensional models by means of layering, the material system including a particulate build material, a binder fluid, one or multiple activators and/or means, with the aid of which the moisture content may be regulated.

The material system according to the invention may be used for the method according to the invention. It contains substances or substance mixtures which regulate the moisture (e.g., the water content and/or the moisture) in the material.

DETAILED DESCRIPTION OF THE INVENTION

Figure 1:
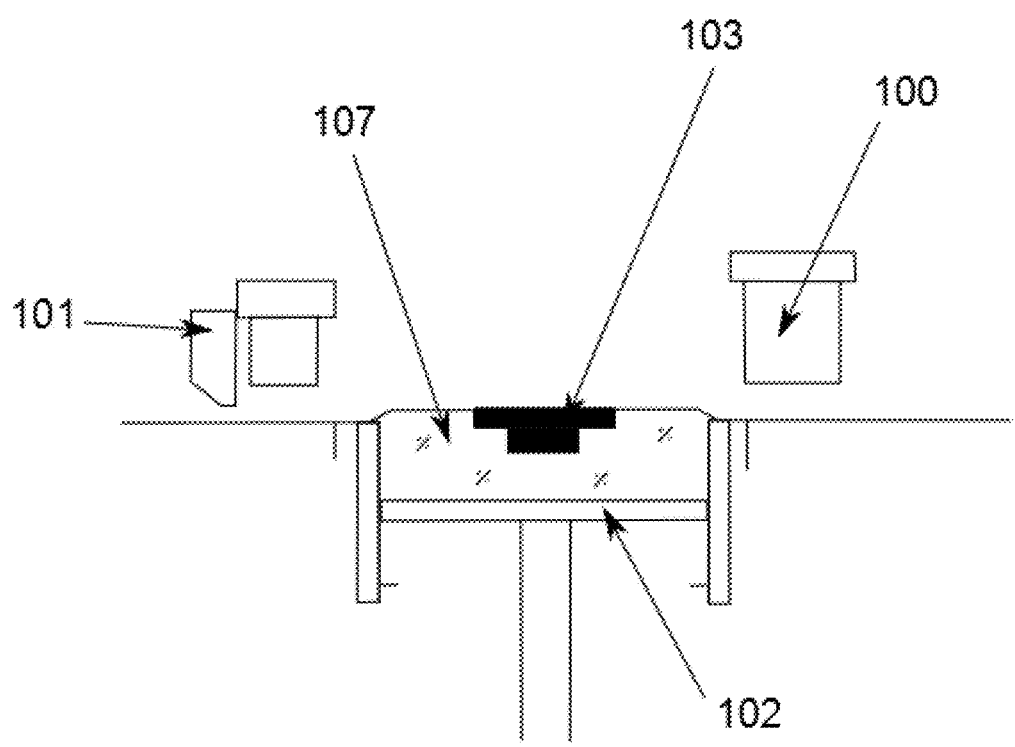
FIG. 1 shows a schematic representation of the components of a powder-based 3D printer.

A number of terms are first explained in greater detail:

A "binder" or "binder system" within the meaning of the invention comprises two components and generally relates to a mixture which primarily comprises furfuryl alcohol. All known furfuryl alcohols and additives which are compatible with 3D printing may be used to improve the adherence to the sand and the increase in strength. The second component, the acid, which is also referred to as the activator, is admixed with the sand independently of the point in time of the actual print process. These are acids which have a sufficient acidity to quickly start the condensation reaction and to result in a sufficient solidification of the binder. The aforementioned components are known to those skilled in the art and will not be described in greater detail here. Special components which are mixed into the sand to regulate the moisture content in the sand mixture are specified in the following description.

All materials known for powder-based 3D printing, in particular sands, ceramic powders, metal powders, plastics, wood particles, fibrous materials, celluloses and/or lactose powders, may be used as "build materials" or "particulate materials." The particulate material is preferably a dry, free-flowing and a cohesive, firm powder.

"Activator" within the meaning of the invention is preferably an acid mixture which includes harsh organic and/or inorganic acids and preferably has a pKa value that is less than 1 and an acid content of 50% to 90%.

Within the meaning of the invention, "moisture" in the particulate material designates two relative quantity indications. On the one hand, it is the water content and, on the other hand, it is the content of an arbitrary liquid which influences the flow properties of the particulate material.

All types of inorganic and organic hygroscopic substances or mixtures thereof may be used to "regulate the moisture."

Corresponding acids may also be used, which are able to both start the polymerization and regulate the moisture. Non-acidic regulators may furthermore be used. For example, the following may be considered as substances: sulfuric acid, phosphoric acid, diphosphoric acid, p-toluenesulfonic acid or lactic acid; sodium chloride, calcium chloride, ammonium acetate or salicylates as well as organic compounds, such as triacetin, glucose, sucrose or sorbitol; ethanediol or 1,2-propanediol and polyols such as pentaerythritol or xylitol and their ethers, such as polyethylene glycol. The activator mixture may contain the acids which are active as an activator component in a proportion of up to 95 wt %

However, a proportion of 60 wt % to 95 wt % is preferred, particularly preferably 60 wt % to 70 wt %. The activator mixture may contain the substances, salts and organic components which are not active as activators in a proportion of up to 50 wt %. Proportions of up to 30 wt % are preferred, particularly preferably proportions of less than 10 wt %.

The "moisture-regulating substance" or "humectant" within the meaning of the invention is any substance or substance mixture which is suitable for regulating or stabilizing the moisture content and the flow properties of a build material. Substances which do not evaporate at room temperature and which prevent the activator from crystallizing may generally be considered for this purpose. Examples hereof are, for example, hexanol, ethylene glycol, propylene glycol, glycerol. Polymers, such as polyethylene glycols or polypropylene glycols, are also suitable. Longer-chain substances which have a low vapor pressure at room temperature may generally also be used. These substances may be present as a component of the activator mixture in quantities of up to 50 wt %, preferably 5 wt % to 30 wt % and particularly preferably 5 wt % to 15 wt %.

Within the meaning of the invention, "selective binder application" or "selective binder system application" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Finishing treatment steps" or "additional treatment steps" within the meaning of the invention are all methods known to those skilled in the art, to which the molded body produced by the 3D printing process may be subjected, for example a heat treatment.

"Molded body," "component," "3D component," "model" or 3D molded body within the meaning of the invention are all three-dimensional objects which are manufactured with the aid of the method according to the invention, the material system and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and do not need to be listed in greater detail here.

The object of the invention is achieved by a method for producing three-dimensional molded parts by means of layering, particulate build material being applied to a build space in a defined layer thickness with the aid of a coater, binder fluid being selectively applied to the build material by means of a print head, the binder fluid being polymerized with the aid of at least one activator introduced into the sand, the build space being lowered by the distance of the layer thickness, or the coater being raised by the distance of one layer thickness, and these steps being repeated until the desired molded part is produced, means being present in or introduced into the build material, binder fluid and/or activator which may be used to regulate the moisture content of the build material mixture.

With the aid of the invention, it is advantageously possible to positively influence the moisture in the particulate build material and during the process of building 3D molded bodies and to maintain the moisture within an advantageous range. The disadvantages of known 3D printing methods are reduced or entirely avoided thereby.

In one preferred method of the invention, the at least one activator is mixed into the build material independently of the point in time of the build process.

The object of the invention is also achieved by a material system for producing three-dimensional models by means of layering, the material system including a particulate build material, a binder fluid, one or multiple activators and/or means by which the moisture content may be regulated.

The material system according to the invention may preferably include an activator, the activator comprising an organic and/or inorganic acid in a proportion of 50% to 90%, preferably 60% to 80%, particularly preferably 65% to 75%.

In one preferred specific embodiment, the activator includes one or multiple humectants; the material system preferably includes hygroscopic inorganic and/or organic acids and/or other hygroscopic compounds as the humectant; the acid is preferably a sulfuric acid or p-toluenesulfonic acid, and the hygroscopic compound preferably includes diols and their ethers.

In the material system according to the invention, the relative proportion of activator with respect to the build material is preferably 0.1% to 1.0%, preferably 0.25% to 0.45%, particularly preferably 0.3% to 0.4%.

All suitable binders and binder fluids may be used in the material system; the binder is preferably selected from the group of acidically condensable monomers and/or oligomers. The binder fluid preferably includes furfuryl alcohol and/or resol resins.

The material system according to the invention may include cross-linking agents, wetting agents and/or adhesives in its binder fluid.

Different components, which are combinable with other components, may be used for the material system according to the invention and selected from a number of build materials. The particulate build material essentially comprises an inorganic particulate material, more preferably essentially silica sand. The average grain size may vary and preferably has an average grain size of 50 μm to 1 mm, more preferably 100 μm to 500 μm, particularly preferably 140 μm to 250 μm.

The invention furthermore relates to a molded body produced according to a method according to the invention or a molded body produced using a method according to the invention. A molded body of this type may be used as a casting mold and/or core in foundry processes or as a mold and/or core for lamination processes. The foundry process may be a concrete, mineral or reactive polymer casting process. The molded body according to the invention may furthermore be used as an illustrative model, a sculpture or an element of an add-on part directly or after an infiltration.

Finally, the invention relates to a device suitable for a method according to the invention and/or a material system according to the invention.

Other preferred aspects of the invention are illustrated below.

In one aspect, the invention relates to a method in which the moisture content in the powder is regulated through a suitable means. The reactivity and flow property of the mixture is thus also regulated in a second operation.

Two properties are affected, as described: the reactivity and the flow property. In water-based activator systems, the regulation may take place entirely by regulating the water content. In general, the two properties must be examined separately, for example in systems having alcohols as the dissolution/dilution means, and means must be provided to influence the two properties separately.

In particular, the invention relates to a material system, more precisely to an acid mixture, which is suitable to start a polycondensation reaction of a cold resin binder and which also may be mixed into the particulate material independently of the time of the actual 3D printing process. Components are provided in the material system, which keep moisture constant and thus also physical and chemical properties in the admixed particulate material.

Harsh organic and/or inorganic acids having a pKa value of less than 1 and an acid content between 50% and 90% have proven to be particularly useful in acid mixtures (activators) according to the invention of cold resin binders for the purpose of hardening.

In addition, the activator contains humectants which, in preferred embodiments, regulate the moisture content in the activator sand mixture, as described. Hygroscopic inorganic and/or organic acids may be used for this purpose. For example, sulfuric acid, phosphoric acid, diphosphoric acid, p-toluenesulfonic acid or lactic acid may be used.

All suitable humectants may be used alternatively or additionally in the activator according to the invention, both hygroscopic inorganic and/or organic salts being suitable, such as sodium chloride, calcium chloride, ammonium acetate or salicylates as well as organic components such as triacetin, glucose, sucrose or sorbitol.

In another preferred specific embodiment, the activator according to the invention is characterized in that it contains hygroscopic compounds, which come from the group of alcohols, particularly preferably the group of diols, such as ethanediol or 1,2-propanediol, and polyols, such as pentaerythritol or xylitol and their ethers, such as polyethylene glycol.

In another preferred specific embodiment according to the invention, the activator is mixed with the build material in a mechanical mixer independently of the time of the actual build process, the quantity of the activator with respect to the particulate material being 0.1% to 1.0%, preferably 0.25% to 0.45% and particularly preferably 0.3% to 0.4%.

The invention also relates to a binder belonging to a material system, suitable for a 3D printing process, which includes or comprises at least one acidically polymerizable monomer and/or prepolymer and possibly additional additives. Solvents may be added to the binder system to adjust the viscosity.

The binder system according to the invention preferably contains furfuryl alcohol or its oligomers as a main component.

The proportions of furfuryl alcohols and additives contained in the binders of the invention for increasing the strength and improving the binding to the sand may vary, depending on the application, and may be adapted to the printed components, depending on the requirements. As described above, either an acid or mixtures of different acids of both an inorganic and organic nature, or both, may be used to activate the sand. For example, furfuryl alcohol, its oligomers, bisphenol A, resorcinol, SCHWEGO fluor and tetraethyl silicate may be used as binder components. Furfuryl alcohol may make up 95 wt % of the mixture. Between 95 wt % and 50 wt % is preferred, particularly preferably 95% to 75%. The oligomers of the furfuryl alcohol may be present in a proportion of up to 50 wt %, preferably less than 30%, particularly preferably less than 15%. Resorcinol or bisphenol A may make up a total of 20 wt % of the binder. Less than 17 wt % is preferred, particularly preferably less than 15 wt %. SCHWEGO fluor may be present in quantities up to 5 wt %. In this case, less than 2 wt % is preferred, particularly preferably less than 1 wt %. Tetraethyl silicate may be present in the binder in quantities of up to, for example, 20%. Less than 5 wt % is preferably added, particularly preferably less than 2 wt %.

Other additives may also be added to the binder, which increase the strength of the polymerisate by cross-linking. Between 5% and 25%, particularly preferably 10% to 20%, of cross-linking agent, such as bisphenol A or resorcinol, is preferably used.

In one particularly preferred specific embodiment of the invention, the binder system contains wetting agents, which [sic; comprise] silicone-containing and/or fluorine-containing tensides (e.g., SCHWEGO® fluor 6543) for adjusting the surface tension, as well as adhesives, such as tetraethyl silicate, for binding the polymer to sand.

The binder system according to the invention demonstrates one or multiple of the following advantageous characteristics at room temperature: In the preferred specific embodiment, the viscosity is between 5 and 40 mPas, particularly preferably between 8 and 20 mPas; a surface tension between 20 and 40 mN/m is preferred, particularly preferably between 25 and 35 mN/m. In one preferred specific embodiment, the vapor pressure of the binder system is no higher than 60 Pa, particularly preferably no higher than 55 Pa.

The material system according to the invention may be applied to different particulate materials. It is important that the acidic nature of the activator not be suppressed. Alkaline-acting sands are suitable, depending on the alkalinity, insofar as they are compatible with the other components.

Silica sands having an average grain size from 50 μm to 500 μm are preferably used for the method. The range from 90 μm to 250 μm is particularly preferable. Sands of a deviating chemical composition are also preferred. For example, artificial sands, such as the so-called cerabeads, are suitable. However, zircon sand, chrome ore and Kerphalite are also suitable.

The method according to the invention advantageously provides a chemical system made up of an activator, which, due to the selection of the special components, was surprisingly able to achieve the fact that its activity in a sand/activator mixture is maintained over a long storage period, due to its regulating property with respect to the moisture. Independently of the mixing point in time, high unpacking and final strengths may be achieved in a 3D printing process with the aid of an acidically condensable resin. A mixer directly on the 3D printer may also be advantageously dispensed with. The method furthermore permits a uniform quality of the components to be ensured, regardless of the prevailing climatic conditions.

It has proven to be particularly advantageous that the storage and refilling or repumping of harsh acids at the 3D printing machine may be dispensed with, and thus both the people and the machines may be protected against the caustic and corrosive properties of the acids.

FIG. 1: shows a schematic representation of the components of a powder-based 3D printer.

Figure 2:
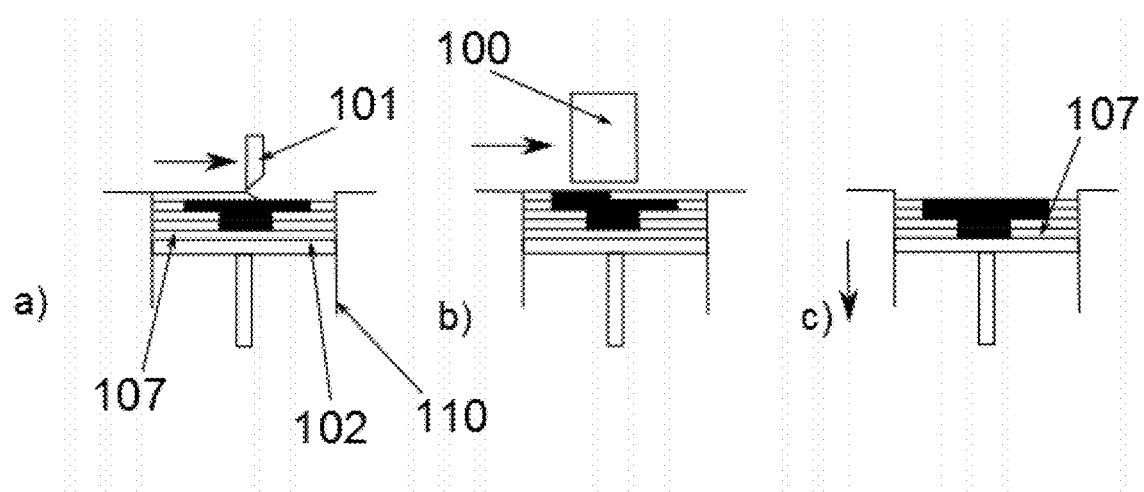
FIG. 2 shows a sequence of a conventional 3D printing.

FIG. 2: shows a sequence of a conventional 3D printing process: a) applying a new layer of particulate material; b) printing binder material onto the layer; c) lowering the building platform.

Figure 3:
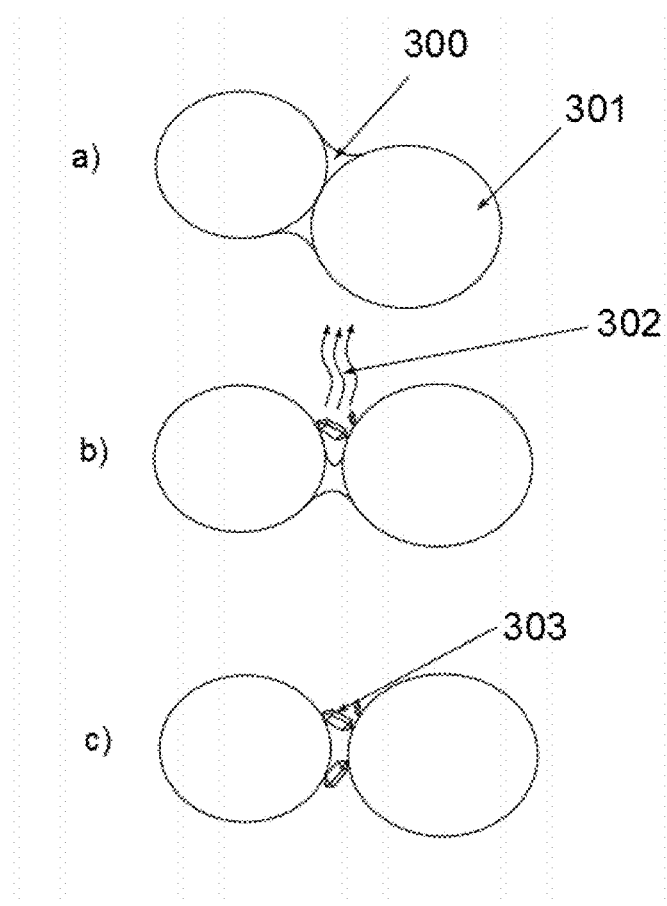
FIG. 3 shows the effect of liquid on the flow properties of particulate build materials.

FIG. 3: shows the effect of liquid on the flow properties of particulate build materials: a) liquid bridge between the particles having a comparatively great attractive force due to capillary forces; b) evaporation of liquid and consequently a weaker force; c) completely evaporated liquid.

Figure 4:
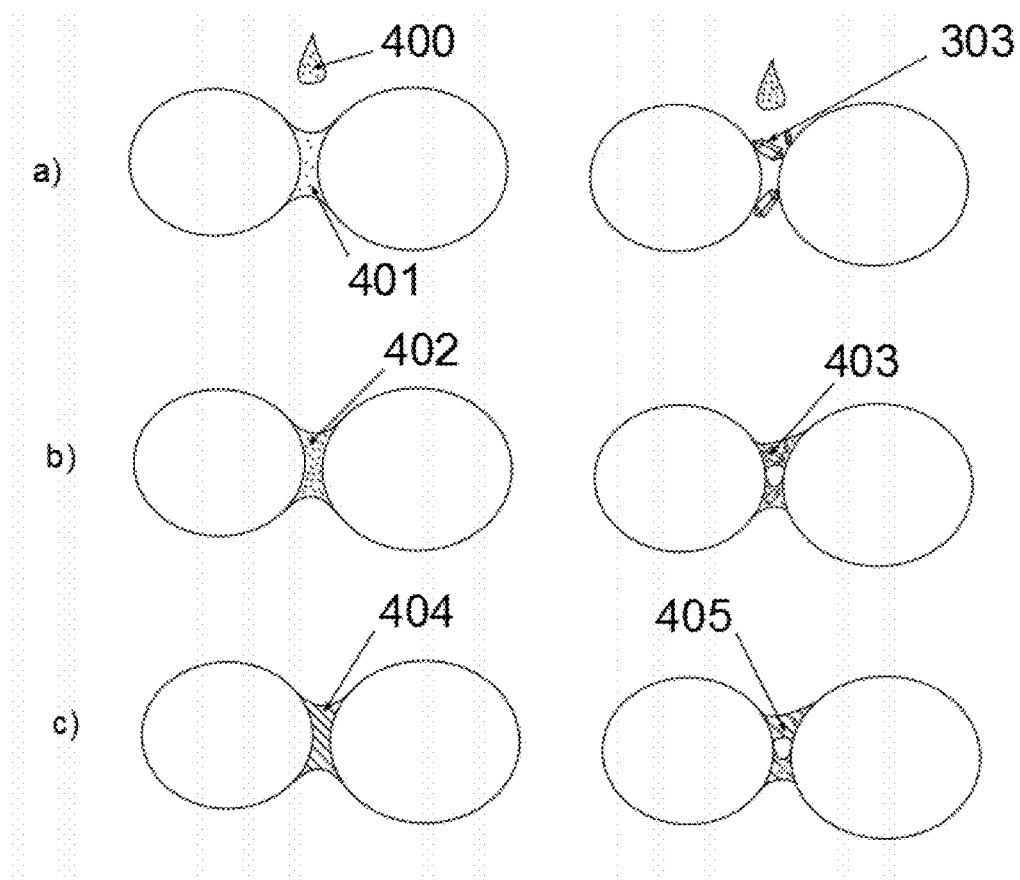
FIG. 4: shows the reduction in reactivity in polymerization activators in crystalline form.

FIG. 4: shows the reduction in reactivity in polymerization activators in crystalline form; a) printing the binder on a still liquid particulate material and a completely dried one; b) mixing the liquids or starting to dissolve the activator crystals; c) complete solidification of the liquid-liquid mixture and partial solidification of the liquid-crystalline mixture.

Figure 5:
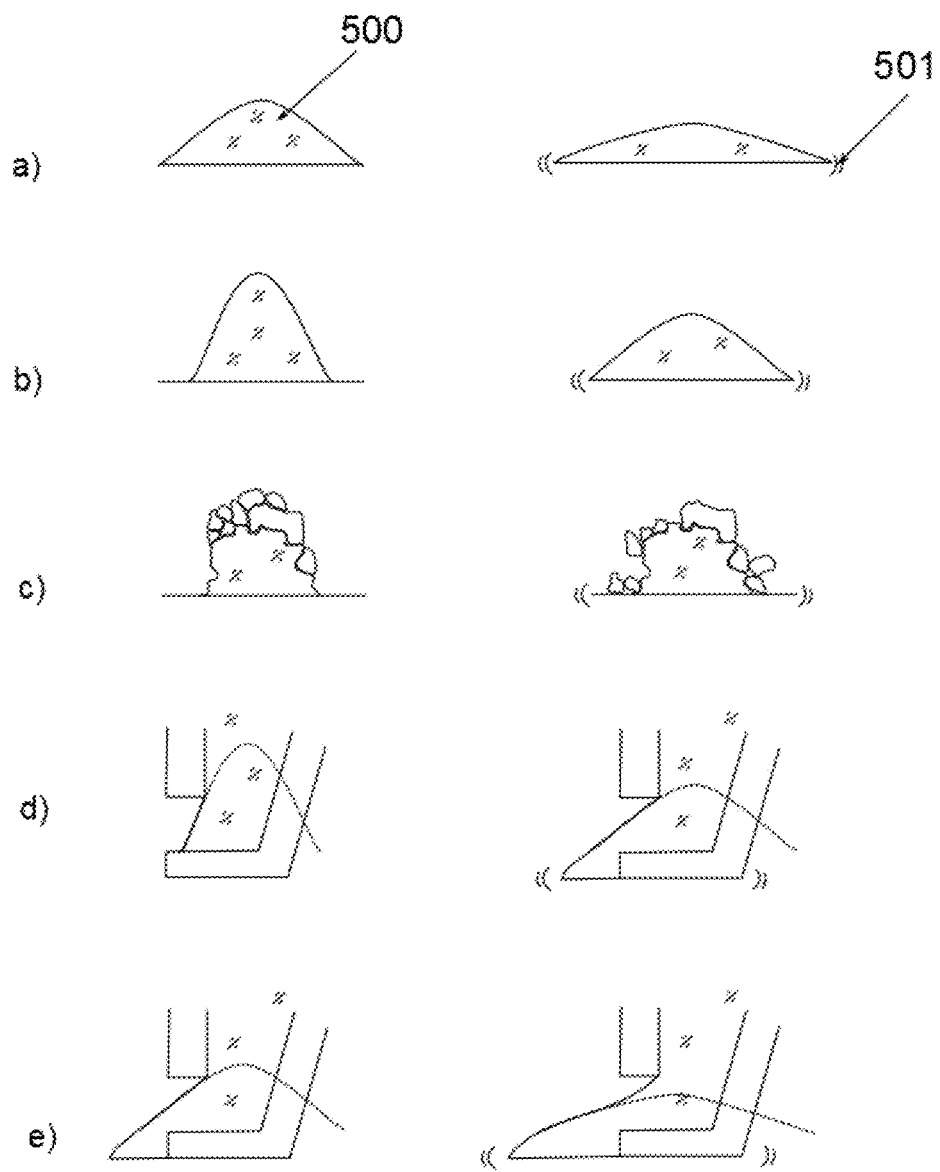
FIG. 5: shows an illustration of different flow properties of build materials with respect to a fixed configuration of the device.

FIG. 5: shows an illustration of different flow properties of build materials with respect to a fixed configuration of the device: a) angle of repose of a free-flowing material at rest and under vibrations; b) angle of repose of a process-compatible material at rest and under vibrations; c) angle of repose of a highly cohesive and process-incompatible material at rest and under vibrations; d) a process-compatible material in the gap of the coater at rest and under the action of vibrations; e) a too free-flowing material in the gap of the coater and under the action of vibrations.

EXAMPLES

General:

The method according to the invention is used in the so-called powder-based 3D printing process.

In particular, the invention relates to a method for producing a component (3D molded body), particulate material being mixed with an acid mixture which contains means for regulating moisture, in a first step, which takes place independently of the time of the actual printing process.

This sand/acid mixture is applied as a particle layer to a building platform with the aid of a powder coater (101), a binder is selectively applied in a second step with the aid of a binder dosing device (100), the building platform (102) is lowered, or the powder coater (101) and possibly other device components is/are raised, by the distance of one layer thickness. These steps are repeated until the desired component(s) (103) is/are built.

A device for the 3D printing method according to the invention may use the process units illustrated in FIG. 2. The device according to the invention includes a powder coater (101). Particulate material is applied thereby to a building platform (102) and smoothed (FIG. 2(a)). A powder stock is present, which is transported over the build space. The outflow of particulate material onto the build space is activated by applying a vibration. A blade below the powder stock smooths the powder. A device which is suitable for the process may be found in the specification DE 10 2004 008 168 A1.

A suitable device may likewise include a roller coater. After the powder is deposited in front of the roller, the latter produces a smooth powder layer by means of a bidirectional roller movement.

The applied particulate material (107) may consist of a wide range of materials. For example, sands, ceramic powders, metal powders, plastic, wood particles, fibrous materials, celluloses, lactose powders, etc. may be used. The flow characteristics of these materials may vary enormously.

The various aforementioned coater techniques permit the layering of dry, free-flowing powders as well as cohesive, firm powders. The height of the powder layers is determined by the building platform. It is lowered after one layer has been applied. During the next coating operation, the resulting volume is filled and the excess is smoothed by a blade or a roller, as described.

To produce the layers, each device (101) operates satisfactorily only within one particular range of particulate material properties.

If the activator is applied to the grain prior to the process, according to the invention, it forms liquid bridges (300) between the particles (301). These bridges result in a reduced flowability, compared to the dry particulate material.

According to the methods of the prior art, this material is processed as quickly as possible into a layer, so that the liquid does not evaporate (302). This is necessary, on the one hand, so that no difficult-to-dissolve crystals (303) of the activator form later on. On the other hand, the flow property of the material should not change during the process to the extent that the material is no longer able to be safely processed using the setting of the coater (101).

FIG. 5 illustrates various related scenarios. For example, a vibration coater is used for the method. It has a gap, from which the material should not flow out as long as no vibration is applied to the coater. FIG. 5b and FIG. 5d show process-compatible materials. FIG. 5a shows a too free-flowing material, whose behavior in the coater is illustrated in FIG. 5e. It flows in front of the blade even without vibrations. FIG. 5c, in turn, shows a cohesive material, which is difficult to work in a reliable process, using this technique.

According to the invention, the material system for the particulate material contains components which regulate the flow property. Thus, one is always in the process area shown in FIG. 5d, once a process setting has been made.

Another essential aspect of the invention results by stabilizing the particulate material with respect to environmental influences: The particulate material (107) not bound in the component may be advantageously collected after the build process and resupplied to the process after sieving. This recycling process results in an enormous increase in the economical and ecological efficiency of the method.

According to the invention, the binder dosing device/print head (100) may comprise, for example, an ink-jet print head, which selectively doses the binder onto the build space in individually dispensable droplets. Without limiting the invention, the binder dosing device (100) may also comprise a filament dispensing system, the binder being selectively dosed onto the build space in the form of a thin, switchable filament.

After a coating process, a liquid is printed onto the layer with the aid of this ink-jet print head (FIG. 2(b)). The print image corresponds to the section of the component at the present build height of the device. The fluid strikes and slowly diffuses into the particulate material.

After this step, the building platform (102) is lowered by the distance of one layer thickness. The complete component (103) is produced by repeating these specified steps.

The desired component (103) is now embedded in loose particulate material (107). Depending on the design of the device, the building platform may be removed from the complete, built-up particulate material with the aid of build containers (110).

The components are unpacked by removing the surrounding powder from the components. This may be done with the aid of brushes and paint brushes and scoops. The material may also be unpacked using an extractor.

The unbuilt particulate material may be reused, as described, depending on the material system employed. A certain proportion of new powder is usually fed into the device to avoid quality degradation. Depending on the material system, however, various influences on the powder must be taken into account. For example, the extraction of the powder may damage the powder, despite regulating means in the material system.

Use of the Method with Silica Sand:

The use of the material system with silica sand is described below as an example of the method.

The particulate material base of silica sand, which has an average grain size of 140 μm, is mixed with the activator before the process. The activator comprises a mixture of:
5% sulfuric acid
60% p-toluenesulfonic acid
2% phosphoric acid
18% water
10% propylene glycol
5% sodium salicylate This activator is prepared with sand in a premixture. 75 g of activator is added to 5 kg. Another 5 g of pyrogenic silicic acid is added thereto for the purpose of modifying the flowability of the mixture. This mixture is mixed using a high-energy mixing tool. This mixture is subsequently mixed with 20 kg of pure silica sand, for example using a simple gravity mixer.

A mixture of:
70% furfuryl alcohol
17% prepolymer
8% resorcinol
5% bisphenol A is used as the binder. According to the invention, this mixture may be printed using an ink-jet print head. It is printed in a proportion of 2.2% with respect to the sand mass. A bending strength of 150 $N/mm^2$ is achieved for the printed bodies after a waiting period of approximately 4 hours. This bending strength may be increased to more than 250 $N/mm^2$ by employing an oven process at 120° C. for 1 hour.

LIST OF REFERENCE NUMERALS

100 Print head
101 Coater
102 Building platfor
103 Component
107 Powder bed/powder cake
110 Build container
300 Liquid
301 Particle
302 Evaporating liquid
303 Activator crystals
400 Binder fluid droplets
401 Activator as a liquid with activating components
402 Binder/activator mixture
403 Activator crystal made smaller by the liquid
404 Compound solidified by the reaction
405 Undissolved activator crystals not involved in the reaction 500 Particulate material
501 Vibration

What is claimed is:

1. A material system for producing three-dimensional models by layering, the material system comprising:
as a first material in a coater:
an admixture including
i.) a particulate build material; and
ii.) one or multiple dissolved activators including one or more humectants;
wherein the admixture includes water and is capable of being applied in layers using the coater; and
as a second material in a print head:
iii.) a binder fluid for selectively applying over the admixture with the print head;
wherein the humectant aids in a regulation of a moisture content of the admixture, so that a final strength may be achieved in a 3D printing process, even after a storage time of the admixture; wherein the admixture includes liquid bridges between particles of the particulate build material;
wherein the one or more humectants comprises a phosphoric acid, a diphosphoric acid, a lactic acid, sodium chloride, calcium chloride, ammonium acetate, a salicylate, triacetin, glucose, sucrose, sorbitol, 1,2-propanediol, pentaerythritol, xylitol, or polyethylene glycol.

2. The material system of claim 1, wherein the activator is made of an organic and an inorganic acid in a proportion of 60 wt % to 95 wt % and the activator includes a humectant.

3. The material system of claim 1, wherein,
the binder fluid is selected from the group of acidically condensable monomers and/or oligomers, and/or
the binder fluid includes furfuryl alcohol and/or resol resins, and/or
the binder fluid includes cross-linking agents, wetting agents and/or adhesives.

4. The material system of claim 1, wherein the build material comprises an inorganic particulate material.

5. The material system of claim 1, wherein the particulate material has an average grain size of 50 µm to 1 mm.

6. The material system of claim 1, wherein
the activator is made of an organic acid or an inorganic acid in a proportion 60% to 80% weight percent.

7. The material system of claim 6, wherein the acid is sulfuric acid or p-toluenesulfonic acid.

8. The material system of claim 6, wherein the activator includes a humectant.

9. The material system of claim 8, wherein the binder fluid is selected from the group of acidically condensable monomers and/or oligomers.

10. The material system of claim 8, wherein the binder fluid includes furfuryl alcohol and/or resol resins.

11. The material system of claim 8, wherein the particulate material has an average grain size 100 µm to 500 µm.

12. The material system of claim 1, wherein
wherein the activator is made of an organic and/or inorganic acid in a proportion of 60 wt % to 95 wt %;
the activator includes a humectant;
the humectant compound including diols;
the build material comprises an inorganic particulate material having an average grain size of 50 µm to 1 mm;
the particulate build material includes a sand; and
the at least one activator is mixed into the particulate build material.

13. The material system of claim 12, wherein,
the binder fluid includes acidically condensable monomers and/or oligomers.

14. The material system of claim 12, wherein the binder fluid includes furfuryl alcohol and/or resol resins.

15. The material system of claim 12, wherein the binder fluid includes cross-linking agents, wetting agents and/or adhesives.

16. The material system of claim 12, wherein the activator includes sulfuric acid.

17. The material system of claim 12, wherein the activator includes p-toluenesulfonic acid.

18. A material system for producing three-dimensional models by layering, the material system comprising:
as a first material in a coater:
an admixture including
i.) a particulate build material; and
ii.) one or multiple dissolved activators including one or more humectants;
wherein the admixture includes water and is capable of being applied in layers using the coater; and
as a second material in a print head:
iii.) a binder fluid for selectively applying over the admixture with the print head;
wherein the humectant aids in a regulation of a moisture content of the admixture, so that a final strength may be achieved in a 3D printing process, even after a storage time of the admixture; wherein the admixture includes liquid bridges between particles of the particulate build material;
wherein the humectant includes sodium chloride, calcium chloride, ammonium acetate, a salicylate, triacetin, glucose, sucrose, or sorbitol.

19. A material system for producing three-dimensional models by layering, the material system comprising:
as a first material in a coater:
an admixture including
i.) a particulate build material including a sand; and
ii.) one or multiple dissolved activators including one or more humectants;
wherein the admixture includes water and is capable of being applied in layers using the coater; and
as a second material in a print head:
iii.) a binder fluid for selectively applying over the admixture with the print head;
wherein the humectant aids in a regulation of a moisture content of the admixture, so that a final strength may be achieved in a 3D printing process, even after a storage time of the admixture; wherein the admixture includes liquid bridges between particles of the particulate build material;
wherein the binder fluid comprises 50 to 95 weight percent furfuryl alcohol; and
the binder further comprises a wetting agent, an adhesive, or a cross-linking agent.

20. The material system of claim 19,
wherein the wetting agent is a silicon-containing tenside or a fluorine-containing tenside;
wherein the adhesive is tetraethyl silicate; and
wherein the cross-linking agent comprises bisphenol A or resorcinol.

* * * * *